(12) United States Patent
Yang et al.

(10) Patent No.: US 12,535,162 B2
(45) Date of Patent: Jan. 27, 2026

(54) QUICK-PLUG CONNECTION CONNECTOR AND LEVELING VALVE

(71) Applicant: ZF Commercial Vehicle Systems (Qingdao) Co., Ltd, Qingdao (CN)

(72) Inventors: Qing Yang, Ji'nan (CN); Qiao Ding, Shanghai (CN); Juan Zhu, Ji'nan (CN)

(73) Assignee: ZF Commercial Vehicle Systems (Qingdao) Co., Ltd, Qingdao (CN)

( * ) Notice: Subject to any disclaimer, the term of this patent is extended or adjusted under 35 U.S.C. 154(b) by 0 days.

(21) Appl. No.: 18/532,811

(22) Filed: Dec. 7, 2023

(65) Prior Publication Data

US 2024/0191819 A1    Jun. 13, 2024

(30) Foreign Application Priority Data

Dec. 12, 2022    (CN) .......................... 202211591735.7

(51) Int. Cl.
*F16L 37/088*    (2006.01)

(52) U.S. Cl.
CPC .............................. *F16L 37/088* (2013.01)

(58) Field of Classification Search
CPC ... F16L 37/088; F16L 37/091; F16L 37/0915; F16L 37/098; F16L 37/0982; F16L 37/092
See application file for complete search history.

(56) References Cited

U.S. PATENT DOCUMENTS

2022/0049804 A1*    2/2022    Klehr .................. F16L 37/0915

\* cited by examiner

*Primary Examiner* — Aaron M Dunwoody
(74) *Attorney, Agent, or Firm* — Walter Ottesen, P.A.

(57) ABSTRACT

A quick-plug connection connector includes: a locking member arranged at a tail end of a connector body and a release ring partially extending into the connector body so as to come into contact with the locking member. An annular receiving groove is formed in the release ring and a sealing ring is received in the annular receiving groove. As the release ring is pressed against the locking member, the locking member is released to form a pipeline installation path leading from the sealing ring to the locking member. In the quick-plug connection connector, the pipeline installation path leading from the sealing ring to the locking member is formed by arranging the sealing ring in front of the locking member so that the pipeline installation requirements can be reduced.

14 Claims, 5 Drawing Sheets

QUICK-PLUG CONNECTION CONNECTOR AND LEVELING VALVE

CROSS-REFERENCE TO RELATED APPLICATIONS

This application claims priority of Chinese patent application no. 202211591735.7, filed Dec. 12, 2022, the entire content of which is incorporated herein by reference.

TECHNICAL FIELD

The present disclosure relates to the technical field of automobile parts and components and in particular, refers to a quick-plug connection connector and a leveling valve.

BACKGROUND

Quick-plug connection connectors provide a convenient plug-and-play convenient connection method, and are widely used in the connection of automobile parts and components.

For example, for a vehicle suspension system with an air spring, it is necessary to use a leveling valve to dynamically sense the height change of a vehicle, and adjust the height of the air spring through air intake/exhaust actions to improve the comfort of a driver and passengers while preventing wheels from being damaged by road impact. The leveling valve is connected to an air intake pipe and an air exhaust pipe leading to the air spring via quick-plug connection connectors.

The current quick-plug connection connector is usually provided with a release ring, a locking member and a sealing ring in sequence in a connector body. The release ring is pressed to release the locking member, and an air pipe is inserted into the connector body to complete the connection between the air pipe and the quick-plug connection connector.

In such a quick-plug connection connector, since the sealing ring is located behind the locking member, if the release ring is not pressed well when installing the air pipe, the air pipe that first enters the connector body will be scratched by the locking member, affecting the sealing performance of the air pipe, so the installation requirements for the air pipe are higher.

It should be noted that information disclosed in the above background art section is only used to enhance the understanding of the background of the present disclosure, and therefore may include information that does not constitute the prior art known to those of ordinary skill in the art.

SUMMARY

In view of this, the present disclosure provides a quick-plug connection connector and a leveling valve, in which a pipeline installation path leading from a sealing ring to a locking member is formed by arranging the sealing ring in front of the locking member, so that the pipeline installation requirements can be reduced. In addition, with this arrangement of the sealing ring, even if a pipeline that first enters the connector body is scratched by the locking member, the air tightness of the pipeline will not be affected, ensuring that the sealing performance of the pipeline always meets the requirements.

According to an aspect of the present disclosure, provided is a quick-plug connection connector, including: a locking member arranged at a tail end of a connector body; a release ring partially extending into the connector body from a head end of the connector body so as to come into contact with the locking member, an annular receiving groove being provided in the release ring; and a sealing ring received in the annular receiving groove, wherein as the release ring is pressed against the locking member, the locking member is released, to form a pipeline installation path leading from the sealing ring to the locking member.

In some embodiments, the sealing ring is made of a flexible material, and the pipeline installation path allows for the insertion of a pipeline; and as the pipeline is inserted into the pipeline installation path, the sealing ring is adaptively adjusted to radially compress the pipeline.

In some embodiments, the sealing ring is formed as a variable-diameter ring; and as the pipeline is inserted into the pipeline installation path, the sealing ring is adjusted to be at least partially radially compressed between the annular receiving groove and the pipeline.

In some embodiments, the sealing ring has a radially-expanded outer wall and a radially-contracted inner wall at two ends; and as the pipeline is inserted into the pipeline installation path, the sealing ring is adjusted to be radially compressed between the annular receiving groove and the pipeline at least at the two ends.

In some embodiments, the sealing ring is made of rubber.

In some embodiments, the quick-plug connection connector further includes: a sealing limiter received in the annular receiving groove and located at a tail end of the sealing ring, wherein the sealing limiter and an end face of the annular receiving groove axially limit the sealing ring.

In some embodiments, an end face of the sealing limiter is provided with bumps configured to abut against the sealing ring.

In some embodiments, an annular outer wall of the sealing limiter is provided with a limiting ring configured to engage with the annular receiving groove.

In some embodiments, a tail portion of the release ring is provided with a radially outward protrusion; and the radially outward protrusion is received in an annular groove of a tail portion of the connector body, and the annular groove limits the movement of the release ring toward the head end of the connector body.

In some embodiments, the locking member includes a body portion connected to the tail end of the connector body, and claw portions gathering from the body portion toward a central axis of the pipeline installation path; and as the release ring is pressed against the locking member, the claw portions spread away from the central axis.

In some embodiments, an outer wall of the connector body is provided with a guide barb.

In some embodiments, the quick-plug connection connector further includes: a locking limiter connected to the tail end of the connector body such that the body portion of the locking member is pressed between the tail end of the connector body and the locking limiter, and the claw portions of the locking member extend into an inner cavity of the locking limiter.

In some embodiments, the quick-plug connection connector further includes: a tapered sealing ring received in the inner cavity of the locking limiter and away from the locking member, wherein a minimum aperture of the tapered sealing ring is adapted to a minimum aperture of the sealing ring.

In some embodiments, the quick-plug connection connector further includes: an O-ring embedded in and protruding radially from an annular outer wall of the locking limiter.

According to another aspect of the present disclosure, provided is a leveling valve, which is equipped with a quick-plug connection connector as described in any of the above embodiments, wherein the pipeline installation path of the quick-plug connection connector leads to a valve chamber of the leveling valve.

Compared with the prior art, the present disclosure has at least the following beneficial effects.

In the quick-plug connection connector of the present disclosure, the pipeline installation path leading from the sealing ring to the locking member is formed by arranging the sealing ring in front of the locking member, so that the pipeline installation requirements can be reduced. Even if a pipeline that first enters the connector body is scratched by the locking member, the air tightness of the pipeline will not be affected because a rear end of the pipeline is in sealing contact with the sealing ring, thereby ensuring that the sealing performance of the pipeline always meets the requirements.

When the quick-plug connection connector is assembled to the leveling valve, the pipeline installation path of the quick-plug connection connector leads to the valve chamber of the leveling valve, so that a sealed connection between an air intake/exhaust pipeline and the leveling valve can be achieved.

BRIEF DESCRIPTION OF DRAWINGS

The invention will now be described with reference to the drawings wherein.

DETAILED DESCRIPTION

Figure 1:
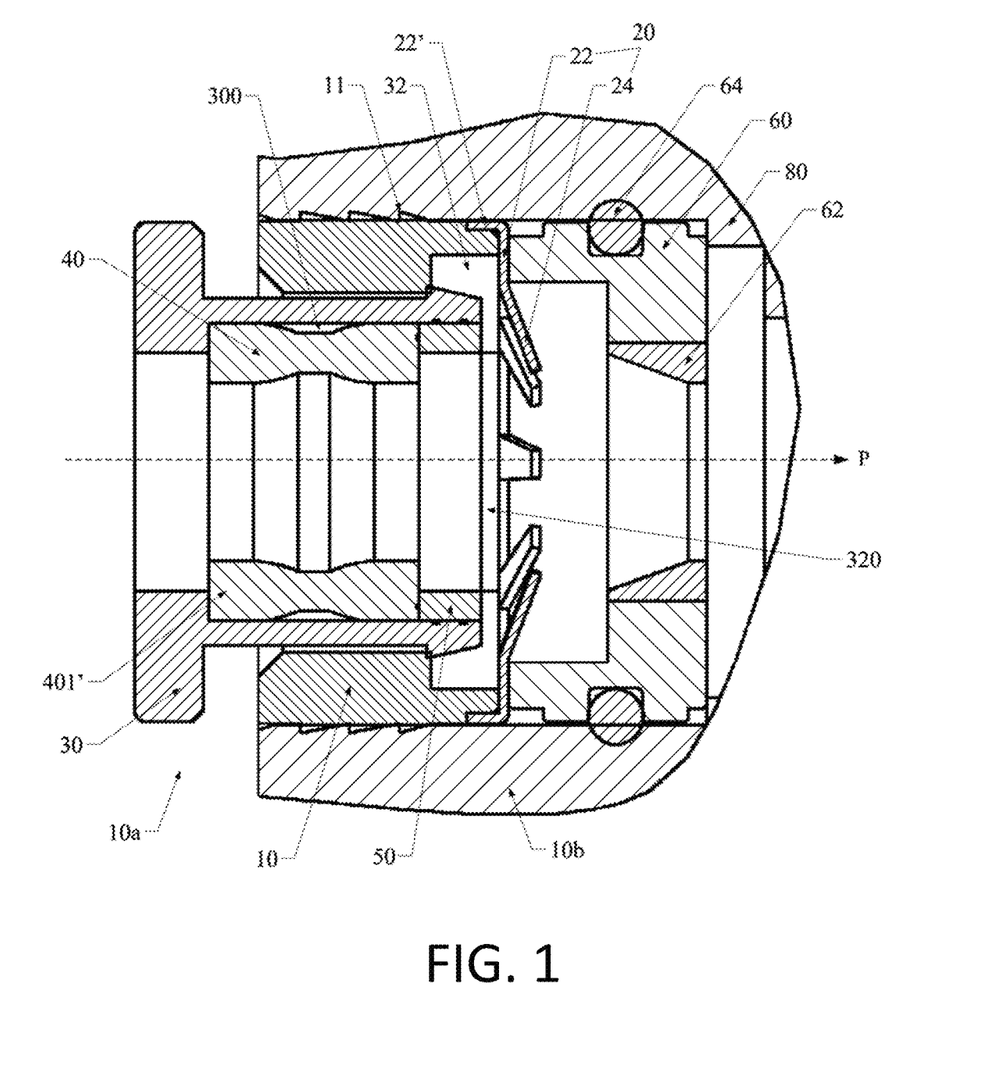
FIG. 1 shows a schematic structural cross-sectional view of a quick-plug connection connector in an embodiment of the present disclosure.

FIG. 1 shows a cross-sectional view of the structure of a quick-plug connection connector in an embodiment of the present disclosure. Referring to FIG. 1, the quick-plug connection connector provided in the embodiment of the present disclosure includes:

a locking member 20 arranged at a tail end 10b of a connector body 10;
a release ring 30 partially extending into the connector body 10 from a head end 10a of the connector body 10 so as to come into contact with the locking member 20, an annular receiving groove 300 being provided in the release ring 30; and
a sealing ring 40 received in the annular receiving groove 300.

As the release ring 30 is pressed against the locking member 20, the locking member 20 is released, to form a pipeline installation path P leading from the sealing ring 40 to the locking member 20.

The pipeline installation path P allows for the insertion of a corresponding pipeline. When installing the pipeline, the release ring 30 is pressed toward the tail end 10b of the connector body 10 to release the locking member 20, and the pipeline is then inserted into the pipeline installation path P in an extension direction of the pipeline installation path P, that is, in a direction pointing from the head end 10a to the tail end 10b of the connector body 10. The pipeline may be an air pipeline, a liquid pipeline, et cetera, depending on the valve object to which the quick-plug connection connector is assembled.

In the quick-plug connection connector described above, the pipeline installation path P leading from the sealing ring 40 to the locking member 20 is formed by arranging the sealing ring 40 in front of the locking member 20, so that the pipeline installation requirements can be reduced. When installing the pipeline, even if the pipeline that first enters the connector body 10 is scratched by the locking member 20, for example, in some cases where the release ring 30 is forgotten to be pressed and the pipeline is inserted directly, the air tightness of the pipeline will not be affected because a rear end of the pipeline is in sealing contact with the sealing ring 40, thereby ensuring that the sealing performance of the pipeline always meets the requirements.

In some embodiments, the sealing ring 40 is made of a flexible material; and as the pipeline is inserted into the pipeline installation path P, the sealing ring 40 is adaptively adjusted to radially compress the pipeline.

An aperture of the pipeline is usually slightly larger than an aperture of the sealing ring 40. During the insertion of the pipeline into the pipeline installation path P, the pipeline will exert a certain squeezing effect on the sealing ring 40. At this time, the sealing ring 40 made of a flexible material can be adaptively adjusted to radially compress the pipeline to ensure the sealing contact with the pipeline, so that the pipeline is in sealing contact with the release ring 30 to prevent air/liquid or the like from entering the valve object from a gap between the release ring 30 and the pipeline.

In some embodiments, the sealing ring 40 is formed as a variable-diameter ring; and as the pipeline is inserted into the pipeline installation path P, the sealing ring 40 is adjusted to be at least partially radially compressed between the annular receiving groove 300 and the pipeline.

The variable-diameter ring refers to an annular structure with different radial dimensions. The radial dimensions include inner diameter dimensions and/or outer diameter dimensions. Since the sealing ring 40 has different radial dimensions, when not inserted into the pipeline, part of the outer wall of the sealing ring 40 is in contact with the annular receiving groove 300 to ensure the tightness of connection, and part of the outer wall is spaced apart from the annular receiving groove 300 to reserve an adjustment space and facilitate the insertion and removal of the pipeline; and/or the aperture of the sealing ring 40, that is, the inner diameter, can also include a plurality of specifications, so that it is possible to reserve the adjustment space through a larger aperture and facilitate the insertion and removal of the pipeline, and also to ensure the sealing contact with the pipeline at least at a smaller aperture. In this way, as the pipeline is inserted into the pipeline installation path P, the sealing ring 40 can be adjusted through the change in shape between different radial dimensions, so that the insertion of the pipeline is facilitated and the insertion resistance of the pipeline is reduced. Moreover, the sealing ring can be adaptively adjusted to be at least partially radially compressed between the annular receiving groove 300 and the pipeline, to ensure that within the axial length of the sealing ring 40, at least part of the sealing ring 40 always radially compresses the pipeline.

Figure 2:
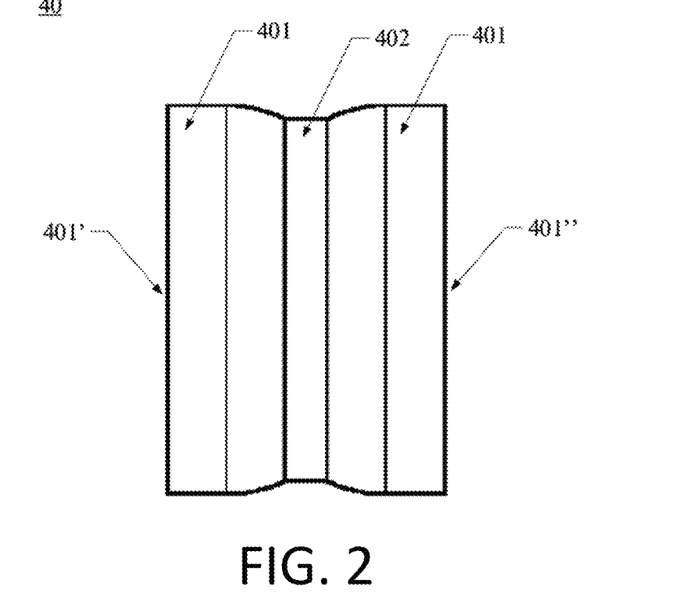
FIG. 2 shows a schematic structural front view of a sealing ring in an embodiment of the present disclosure.
Figure 3:
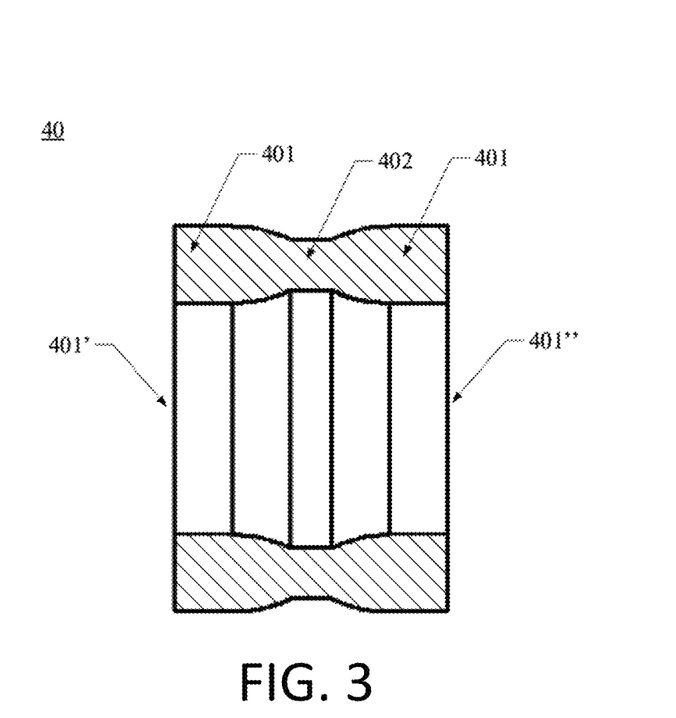
FIG. 3 shows a schematic structural cross-sectional view of a sealing ring in an embodiment of the present disclosure.

FIG. 2 shows a front view of the structure of the sealing ring in an embodiment, and FIG. 3 shows a cross-sectional view of the structure of the sealing ring. As shown in FIGS. 1 to 3, in some embodiments, the sealing ring 40 has a radially-expanded outer wall and a radially-contracted inner wall at two ends 401; and as the pipeline is inserted into the pipeline installation path P, the sealing ring 40 is adjusted to be radially compressed between the annular receiving groove 300 and the pipeline at least at the two ends 401.

The sealing ring 40 has a radially-expanded outer wall and a radially-contracted inner wall at the two ends 401, so that the sealing ring 40 forms a structure in which it is radially contracted from the two ends 401 toward a middle section 402 when viewed from the outside, and a structure in which it is radially expanded from the two ends 401 toward the middle section 402 when viewed from the inner cavity. In this way, the adjustment space can be reserved in the middle section 402 with respect to the annular receiving groove 300 and the pipeline to facilitate the insertion and removal of the pipeline, and the two ends 401 can be used to ensure the sealing contact with the annular receiving groove 300 and the pipeline. Specifically, as the pipeline is inserted into the pipeline installation path P, under the squeezing effect, a head end 401' of the sealing ring 40 is squeezed toward the middle section 402, the adjustment space reserved in the middle section 402 can prevent the head end 401' from warping and folding, which would otherwise affect the sealing contact with the pipeline and the annular receiving groove 300, and can also balance the insertion force of the pipeline, so that the pipeline can be inserted easily, and it is at least ensured that the sealing ring 40 radially compresses the pipeline at the two ends 401. When the installation position of the pipeline needs to be adjusted, for example, when the pipeline needs to be removed for a certain distance, similarly, as the pipeline is removed from the pipeline installation path P, under the squeezing effect, a tail end 401" of the sealing ring 40 is squeezed toward the middle section 402, the adjustment space reserved in the middle section 402 can prevent the tail end 401" from warping and folding, which would otherwise affect the sealing contact with the pipeline and the annular receiving groove 300, and can also balance the removal force for removing the pipeline, so that the pipeline can be removed easily, and after being removed for a certain distance, at least the two ends 401 of the sealing ring 40 radially compress the pipeline.

In addition, where the extension direction of the pipeline is at a certain angle with the pipeline installation path P due to the tilting/bending of an external line, the sealing ring 40 can also radially compress the pipeline through its adaptive adjustment. Compared with the constant-diameter ring structure, the sealing ring 40 of the variable-diameter ring structure has a better sealing performance, can resist the adverse effects of the tilting/bending of the line on the sealing, and ensures the radial compression of the pipeline.

In some embodiments, the sealing ring 40 is made of rubber. Rubber has a certain flexibility and damping properties, facilitating the adaptive adjustment of the sealing ring 40 to radially compress the pipeline when being squeezed.

Figure 4:
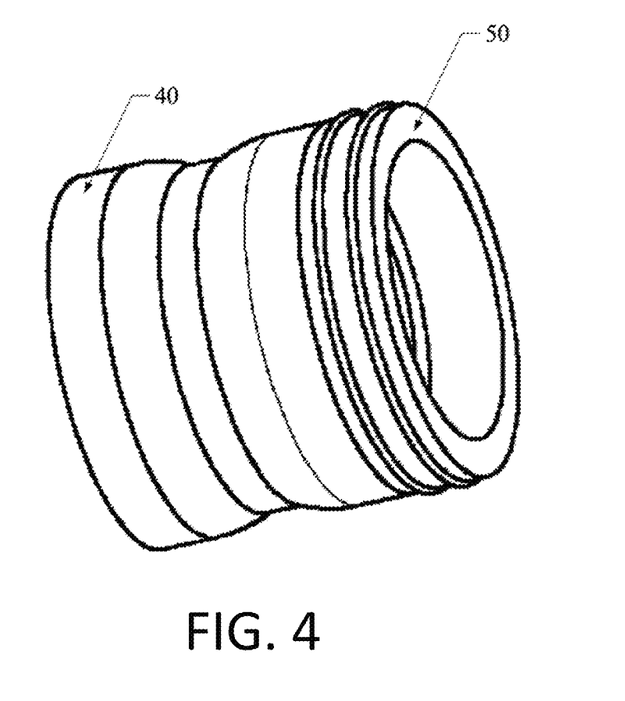
FIG. 4 shows a schematic structural perspective view of a sealing ring and a sealing limiter in an embodiment of the present disclosure.
Figure 5:
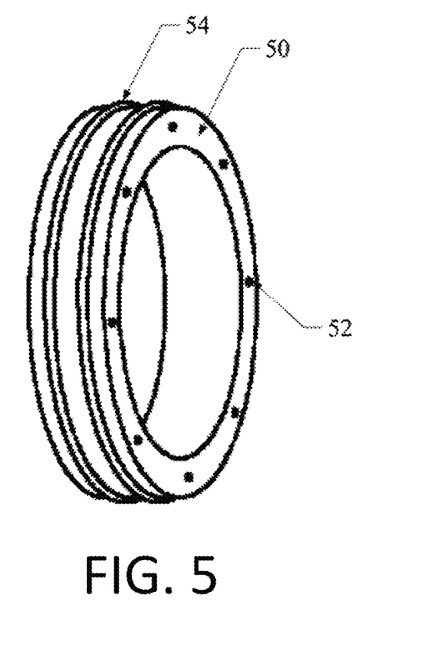
FIG. 5 shows a schematic structural perspective view of a sealing limiter in an embodiment of the present disclosure.

FIG. 4 shows a perspective view of the structures of a sealing ring and a sealing limiter in an embodiment, and FIG. 5 shows a perspective view of the structure of the sealing limiter. As shown in FIGS. 1 to 5, in some embodiments, the quick-plug connection connector further includes: a sealing limiter 50 received in the annular receiving groove 300 and located at a tail end 401" of the sealing ring 40. The sealing limiter 50 and an end face of the annular receiving groove 300 axially limit the sealing ring 40.

The sealing ring 40 is axially limited in the annular receiving groove 300 via the sealing limiter 50, to prevent the sealing ring 40 from being axially displaced during the insertion and removal of the pipeline.

In some embodiments, an end face of the sealing limiter 50 is provided with bumps 52 configured to abut against the sealing ring 40.

The bumps 52 may form round projections, which are evenly distributed on the end face of the sealing limiter 50. The bumps 52 abut against the end face of the sealing ring 40, such that the sealing limiter 50 is in stable contact with the sealing ring 40.

In some embodiments, an annular outer wall of the sealing limiter 50 is provided with a limiting ring 54 configured to engage with the annular receiving groove 300.

A plurality of limiting rings 54 may be provided; and the sealing limiter 50 stably engages with the annular receiving groove 300 via the limiting rings 54.

In other embodiments, other connection methods may be used between the sealing limiter 50 and the annular receiving groove 300. For example, some guide hooks, ribs and other protrusions may be provided on the annular outer wall of the sealing limiter 50, and a groove adapted to the protrusion is provided in the annular receiving groove 300, so as to achieve a stable connection between the sealing limiter 50 and the annular receiving groove 300. The guide hook can not only provide a guiding function in the process of assembling the sealing limiter 50 to the annular receiving groove 300, but also can stably hook the annular receiving groove 300 after the sealing limiter 50 is assembled in place, to maintain a stable assembly between the sealing limiter 50 and the annular receiving groove 300.

In some embodiments, a tail portion of the release ring 30 is provided with a radially outward protrusion 32; and the radially outward protrusion 32 is received in an annular groove of a tail portion of the connector body 10, and the annular groove limits the movement of the release ring 30 toward the head end 10a of the connector body 10.

The release ring 30 can be pressed against the locking member 20 with the radially outward protrusion 32 and is stably limited in the connector body 10 via the radially outward protrusion 32. The radially outward protrusion 32 is provided with a through hole 320 to facilitate the passage of the pipeline.

In some embodiments, the locking member 20 includes a body portion 22 connected to the tail end 10b of the connector body 10, and claw portions 24 gathering from the body portion 22 toward a central axis of the pipeline installation path P; and as the release ring 30 is pressed against the locking member 20, the claw portions 24 spread away from the central axis.

A side face of the body portion 22 may be provided with an annular flange structure 22', and the body portion 22 may be connected to the connector body 10 via the annular flange structure 22'. When the claw portions 24 spread, a space allowing for the insertion of the pipeline can be provided. When the pipeline is inserted in place, the release ring 30 is released, and the claw portions 24 gather toward the central axis of the pipeline installation path P to clamp the pipeline.

In some embodiments, an outer wall of the connector body 10 is provided with a guide barb 11. The guide barb 11 can provide a guiding function when the connector body 10 is assembled to the valve object, and can stably hook the valve object after the connector body 10 is assembled in place, to maintain the assembly stability between the connector body 10 and the valve object.

Figure 6:
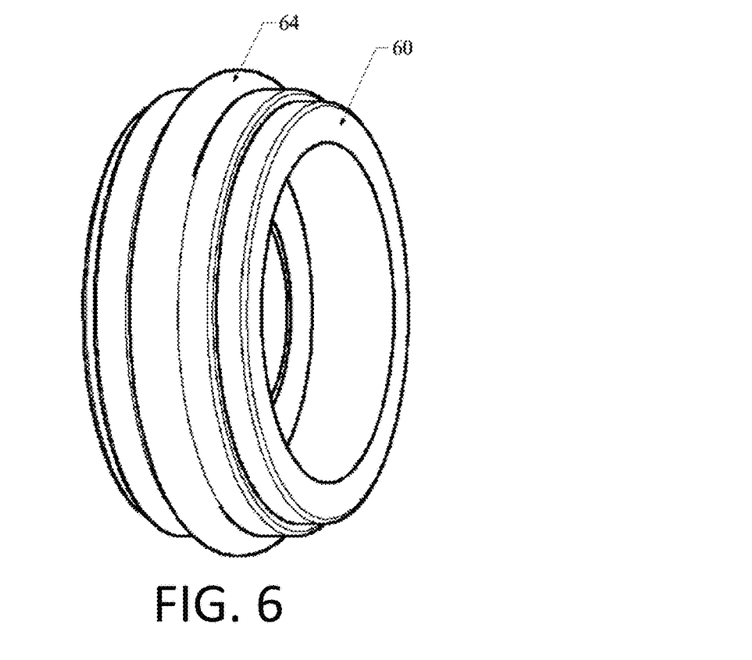
FIG. 6 shows a schematic structural perspective view of a locking limiter in an embodiment of the present disclosure.
Figure 7:
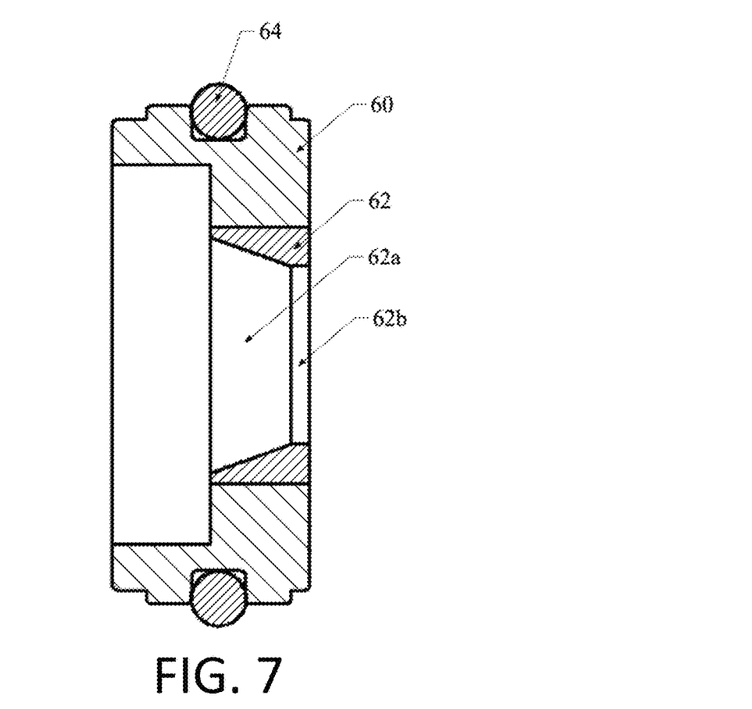
FIG. 7 shows a schematic structural cross-sectional view of a locking limiter in an embodiment of the present disclosure; and, FIG. 8 shows a leveling valve.

FIG. 6 shows a perspective view of the structure of a locking limiter in an embodiment, and FIG. 7 shows a cross-sectional view of the structure of the locking limiter. As shown in FIGS. 1 to 7, in some embodiments, the quick-plug connection connector further includes: a locking limiter 60 connected to the tail end 10b of the connector body 10 such that the body portion 22 of the locking member 20 is pressed between the tail end 10b of the connector body 10 and the locking limiter 60, and the claw portions 24 of the locking member 20 extend into an inner cavity of the locking limiter 60.

The locking member 20 is compressed between the connector body 10 and the locking limiter 60 via the locking limiter 60, and the locking limiter 60 can limit the assembly position of the connector body 10 during the assembly of the connector body 10 to the valve object, so that the quick-plug connection connector can be accurately assembled to an appropriate position of the valve object.

In some embodiments, the quick-plug connection connector further includes: a tapered sealing ring 62 received in the inner cavity of the locking limiter 60 and away from the locking member 20. A minimum aperture of the tapered sealing ring 62 is adapted to a minimum aperture of the sealing ring 40.

The tapered sealing ring 62 may be engaged in the inner cavity of the locking limiter 60, or other suitable connection methods may be used to arrange the tapered sealing ring 62 in the inner cavity of the locking limiter 60. The tapered sealing ring 62 has a large aperture 62a to facilitate the insertion and removal of the pipeline, and has a small aperture 62b adapted to the minimum aperture of the sealing ring 40 to achieve a sealing contact with the pipeline, so as to prevent external impurities from entering the inside of the valve object through a gap between the locking member 20 and the locking limiter 60.

In some embodiments, the quick-plug connection connector further includes: an O-ring 64 embedded in and protruding radially from an annular outer wall of the locking limiter 60.

The locking limiter 60 and the valve object 80 are radially compressed via the O-ring 64, thereby providing an auxiliary sealing function, preventing external impurities from entering the inside of the valve object through a gap between the locking limiter 60 and the valve object 80, and ensuring the assembly sealing performance between the quick-plug connection connector and the valve object 80.

In summary, the quick-plug connection connector provided in the embodiments of the present disclosure has a simple structure and is easy to install, in which a pipeline installation path P leading from a sealing ring 40 to a locking member 20 is formed by arranging the sealing ring 40 in front of the locking member 20, so that the pipeline installation requirements are reduced. When installing the pipeline, even if the pipeline that first enters the connector body 10 is scratched by the locking member 20, for example, if the release ring 30 is not pressed in place or the pipeline is directly inserted and removed violently, the airtightness of the pipeline will not be affected because a rear end of the pipeline is in sealing contact with the sealing ring 40, thereby ensuring that the sealing performance of the pipeline always meets the requirements. In the quick-plug connection connector provided in the embodiments of the present disclosure, the specially configured sealing ring 40 is also used to ensure the connection sealing performance of the pipeline while reducing the difficulty of insertion and removal of the pipeline. In addition, via the auxiliary sealing structures such as the tapered sealing ring 62 and the O-ring 64, the assembly sealing performance between the quick-plug connection connector and the valve object 80 can be further enhanced to prevent external impurities from entering the valve object 80.

Figure 8:
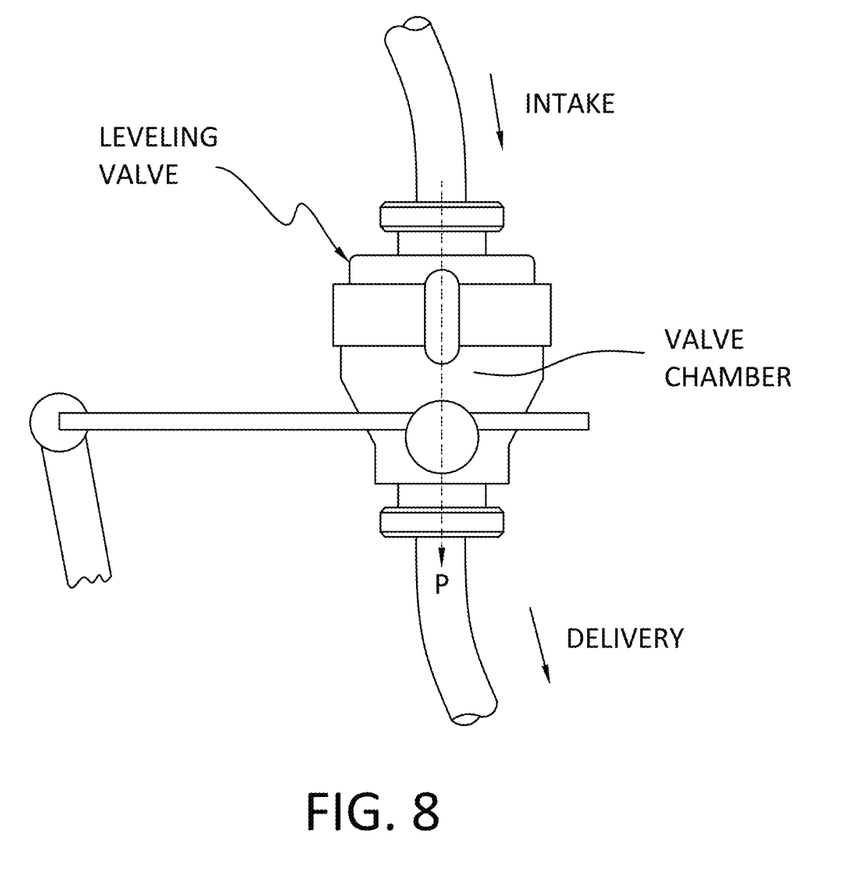

Further, the embodiments of the present disclosure also provide a leveling valve as shown in FIG. 8, which is equipped with a quick-plug connection connector as described in any of the above embodiments. The pipeline installation path P of the quick-plug connection connector leads to a valve chamber of the leveling valve, and an air intake/exhaust pipe of the leveling valve is configured to be inserted in the pipeline installation path P.

In the assembly environment of the vehicle, the air intake pipe of the leveling valve and the air exhaust pipe leading to the air spring usually have a large degree of bending, causing the air pipes inserted into the pipeline installation path P to tilt and have a certain offset amount from the axis line of the quick-plug connection connector. Through the variable-diameter structure combined with its flexible material, the sealing ring 40 can be adapted to the tilting of the air pipe and can be adaptively adjusted to radially compress the air pipe to ensure that there is always at least a part of the sealing ring 40 in radial sealing contact with the air pipe over the axial length of the sealing ring 40, so that the air pipe is stably in communication with the valve chamber of the leveling valve through the quick-plug connection connector.

It is understood that the foregoing description is that of the preferred embodiments of the invention and that various changes and modifications may be made thereto without departing from the spirit and scope of the invention as defined in the appended claims.

The invention claimed is:

1. A quick-plug connection connector comprising:
a connector body having a head end and a tail end;
a locking member arranged at said tail end of said connector body;
a release ring partially extending into said connector body from said head end so as to come into contact with said locking member;
said release ring having an annular receiving groove provided therein;
a sealing ring seated in said annular receiving groove;
said release ring and said locking member being configured to release said locking member in response to said release ring being pressed against said locking member to form a pipeline installation path leading from said sealing ring to said locking member; and
said sealing ring having a radially-expanded outer wall and a radially-contracted inner wall at two ends; and, as a pipeline is inserted into the pipeline installation path, said sealing ring is adjusted to be radially compressed between said annular receiving groove and the pipeline at least at said two ends.

2. The quick-plug connection connector of claim 1, wherein said sealing ring is made of a flexible material; said pipeline installation path is configured to allow insertion of a pipeline; and, said sealing ring is adaptively adjusted to radially compress the pipeline as the pipeline is inserted into the pipeline installation path.

3. The quick-plug connection connector of claim 2, wherein said sealing ring is formed as a variable-diameter ring so as to permit said sealing ring to adjust to be at least partially radially compressed between said annular receiving groove and said pipeline as said pipeline is inserted into the pipeline installation path.

4. The quick-plug connection connector of claim 2, wherein said sealing ring is made of rubber.

5. The quick-plug connection connector of claim 1, wherein a tail portion of said release ring has a radially outward protrusion; said radially outward protrusion is received in an annular groove of a tail portion of said connector body; and, said annular groove is configured to limit movement of said release ring toward said head end of said connector body.

6. The quick-plug connection connector of claim 1, wherein said pipeline installation path defines a central axis; said locking member includes a body portion connected to said tail end of said connector body and having claw portions gathering from said body portion toward said central axis of said pipeline installation path; and, said claw portions are configured to spread away from said central axis in response to said release ring being pressed against said locking member.

7. The quick-plug connection connector of claim 6, further comprising: a locking limiter connected to said tail end of said connector body so as to cause the body portion of said locking member to be pressed between said tail end of said connector body and said locking limiter and said claw portions of said locking member extend into an inner cavity of said locking limiter.

8. The quick-plug connection connector of claim 7, further comprising: a tapered sealing ring received in said inner cavity of said locking limiter and away from said locking member, wherein a minimum aperture of said tapered sealing ring is adapted to a minimum aperture of said sealing ring.

9. The quick-plug connection connector of claim 7, further comprising: an O-ring embedded in and protruding radially from an annular outer wall of the locking limiter.

10. The quick-plug connection connector of claim 1, wherein an outer wall of said connector body has a guide barb.

11. A quick-plug connection connector comprising:
a connector body having a head end and a tail end;
a locking member arranged at said tail end of said connector body;
a release ring partially extending into said connector body from said head end so as to come into contact with said locking member;
said release ring having an annular receiving groove provided therein;
a sealing ring seated in said annular receiving groove;
said release ring and said locking member being configured to release said locking member in response to said release ring being pressed against said locking member to form a pipeline installation path leading from said sealing ring to said locking member; and,
a sealing limiter received in said annular receiving groove and located at a tail end of said sealing ring; and, said sealing limiter and an end face of said annular receiving groove axially limiting said sealing ring.

12. The quick-plug connection connector of claim 11, wherein said sealing limiter has an end face configured to have bumps to abut against said sealing ring.

13. The quick-plug connection connector of claim 11, wherein an annular outer wall of said sealing limiter has a limiting ring configured to engage with said annular receiving groove.

14. A leveling valve comprising:
a valve chamber;
a quick-plug connection connector defining a pipeline installation path leading to said valve chamber;
said quick-plug connection connector further including:
a connector body having a head end and a tail end;
a locking member arranged at said tail end of said connector body;
a release ring partially extending into said connector body from said head end so as to come into contact with said locking member;
said release ring having an annular receiving groove provided therein;
a sealing ring seated in said annular receiving groove; and,
said release ring and said locking member being configured to release said locking member in response to said release ring being pressed against said locking member to form said pipeline installation path leading from said sealing ring to said locking member.

* * * * *